(12) United States Patent
Aghdasi et al.

(10) Patent No.: US 10,679,671 B2
(45) Date of Patent: Jun. 9, 2020

(54) SMART VIDEO DIGEST SYSTEM AND METHOD

(71) Applicant: Pelco, Inc., Andover, MA (US)

(72) Inventors: Farzin Aghdasi, Clovis, CA (US); Kirsten A. Medhurst, Fairfax, VA (US); Greg M. Millar, Coarsegold, CA (US); Stephen J. Mitchell, Reedley, CA (US)

(73) Assignee: Pelco, Inc., Fresno, CA (US)

( * ) Notice: Subject to any disclaimer, the term of this patent is extended or adjusted under 35 U.S.C. 154(b) by 0 days.

(21) Appl. No.: 14/299,939

(22) Filed: Jun. 9, 2014

(65) Prior Publication Data

US 2015/0356996 A1 Dec. 10, 2015

(51) Int. Cl.
*G11B 27/034* (2006.01)
*H04N 5/76* (2006.01)
(Continued)

(52) U.S. Cl.
CPC .......... *G11B 27/034* (2013.01); *G11B 27/005* (2013.01); *H04N 5/7605* (2013.01); *H04N 21/4333* (2013.01); *H04N 21/8549* (2013.01)

(58) Field of Classification Search
CPC ...... H04N 5/93; H04N 21/8549; H04N 5/772; H04N 5/4401; H04N 21/4622; H04N 7/17318; H04N 21/232; H04N 7/181; H04N 21/47217; H04N 5/781; G06F 17/30843; G06F 11/3476; G06F 17/18; G06F 17/40; H04L 29/0809; G05B 23/02; H04W 4/02; G11B 31/006; G11B 27/031
(Continued)

(56) References Cited

U.S. PATENT DOCUMENTS 7,299,152 B1 * 11/2007 Moritz ................... G08B 19/00
340/573.1
2002/0172498 A1 * 11/2002 Esenyan .............. G11B 27/034
386/241
(Continued)

FOREIGN PATENT DOCUMENTS

WO WO 01/27876 4/2001
WO WO 2015/191376 12/2015

OTHER PUBLICATIONS

International Search Report and Written Opinion of PCT/US2015/034358 dated Jul. 24, 2015 entitled "Smart Video Digest System and Method".
(Continued)

*Primary Examiner* — Thai Q Tran
*Assistant Examiner* — Syed Y Hasan
(74) *Attorney, Agent, or Firm* — Tutunjian & Bitetto, P.C.

(57) ABSTRACT

A method of summarizing events in a video recording includes evaluating at least one video recording to identify event that violate at least one rule. The method further includes excerpting a fragment of the at least one video recording. The fragment contains a depiction of the event. The method also includes causing the fragment to be included in a summary video recording. The rules may relate to a threshold amount of motion in a physical space being recorded in the at least one received video recording, or a threshold duration of motion in a physical space being recorded in the at least one received video recording.

20 Claims, 6 Drawing Sheets

(51) Int. Cl.
*G11B 27/00* (2006.01)
*H04N 21/8549* (2011.01)
*H04N 21/433* (2011.01)

(58) Field of Classification Search
USPC .......... 386/278, 227, 241, 285; 340/539.17; 725/135, 37, 38, 88, 102, 90; 709/203; 702/179, 187; 348/159; 455/404.2
See application file for complete search history.

(56) References Cited

U.S. PATENT DOCUMENTS

| | | | |
|---|---|---|---|
| 2006/0117356 A1* | 6/2006 | Jojic | G06F 17/30811 725/88 |
| 2007/0101266 A1 | 5/2007 | Kim et al. | |
| 2007/0124679 A1 | 5/2007 | Jeong et al. | |
| 2007/0157234 A1* | 7/2007 | Walker | H04N 5/44543 725/38 |
| 2007/0168413 A1* | 7/2007 | Barletta | G06F 3/04883 709/203 |
| 2007/0201817 A1 | 8/2007 | Peker | |
| 2008/0282287 A1 | 11/2008 | Chen et al. | |
| 2009/0025039 A1* | 1/2009 | Bronstein | G06F 17/3079 725/60 |
| 2010/0002082 A1* | 1/2010 | Buehler | G08B 13/19645 348/159 |
| 2014/0178031 A1* | 6/2014 | Walker | H04N 9/79 386/227 |
| 2014/0313032 A1* | 10/2014 | Sager | H04Q 9/00 340/539.17 |
| 2015/0024705 A1* | 1/2015 | Rashidi | H04W 4/90 455/404.2 |
| 2015/0341591 A1* | 11/2015 | Kelder | H04N 7/013 386/285 |

OTHER PUBLICATIONS

International Preliminary Report on Patentability for PCT/US2015/034358 dated Dec. 15, 2016 entitled "Smart Video Digest System and Method".
European Office Action—Examination Report for Application No. 15 729 718.5-1209 dated Mar. 16, 2018.

* cited by examiner

Creating a Highlight Reel Rule

MultiSight  
Dashboard  Stores  Cameras  Users  Times For Review  Highlight Reels Web (Admin UI)  
jdoe@gmail.com  [Sign out]

Highlight Reel: [Select ▼]   [Add New] — 102

Name of highlight reel: [New highlight reel] — 104

What type of activity? — 106
- ○ Any activity
- ● Any activity lasting longer than [30 ▲▼] [seconds ▼]
- ○ No activity in the scene, for more than [3 ▲▼] [minutes ▼]

Which store(s)? — 108
- ● All Stores
- ○ Specific stores

Which view? — 110  [Select a view ▼]

Which days? — 112
- ● Every day
- ○ Every weekday (Monday - Friday)
- ○ Every weekend day (Saturday - Sunday)
- ○ Specific day(s)
- ○ Never (disable review)

What times? — 114
- ● Shift [Opening (8:00 AM - 9:30 AM) ▼]
- ○ Timeframe from [6:30 ▲▼] [AM ▲▼] to [9:30 ▲▼] [AM ▲▼]

Playback speed — 116
- ● 4x
- ○ 2x
- ○ regular

[Save] — 118  or Cancel

[Delete Highlight Reel] — 120

FIG. 1

Editing a Highlight Reel Rule

MultiSight                                    Web (Admin UI)

Dashboard    Stores    Cameras    Users    Times For Review                 jdoe@gmail.com [Sign out]

Highlight Reel: [Office Occupied During Lunch ▼] | Highlight Reels

[Add New]

Name of highlight reel: [Office Occupied During Lunch]

What type of activity?
- ○ Any activity
- ● Any activity lasting longer than [30 ▲▼] seconds ← 206
- ○ No activity in the scene, for more than [3 ▲▼] minutes

Which store(s)?
- ● All Stores
- ○ Specific stores

Which view? [Offices ▼] ← 208

Which days?
- ● Every day
- ○ Every weekday (Monday - Friday)
- ○ Every weekend day (Saturday - Sunday)
- ○ Specific day(s)
- ○ Never (disable review)

← 210

What times?
- ● Shift [LUNCH (11:10AM - 1:00 PM) ▼]
- ○ Timeframe: from [8:30 ▲▼] [AM ▲▼] to [9:30 ▲▼] [AM ▲▼]

← 214

Playback speed
- ● 4x
- ○ 2x
- ○ regular

[Save]    or  Cancel

[Delete Highlight Reel]

SMART VIDEO DIGEST SYSTEM AND METHOD

BACKGROUND OF THE INVENTION

Certain types of video recordings, for example surveillance recordings associated with security systems, chronicle an environment over long periods of time. Such video recordings may include only a very few relevant events. Finding and presenting those relevant events can be a long, tedious process.

Existing video surveillance systems do a poor job of directing a reviewer to operational video of interest. The reviewer can search by, for example, date and time, or for video connected with a motion or alarm event, but the reviewer must play back the video one search result at a time. This is a time-consuming process, so reviewers are unlikely to conduct reviews unless they already know there is an issue requiring review.

While some analytic tools aim to filter the search results more effectively, the user is still compelled to play back one video at a time.

SUMMARY OF THE INVENTION

The described embodiments automatically create, from one or more real-time video recordings, a short video that provides a summary of significant events from the real-time recordings.

The following example demonstrates benefit of the described embodiments. Assume that a certain retail establishment includes 10 stores, each with 8 surveillance cameras. Assume also that all of the video from these 80 cameras is stored on a cloud video storage system, producing 1920 hours (10 stores×8 cameras×24 hours) of video in any given day. A district manager in charge of all 10 stores would like to gain useful information from these surveillance videos, but sorting through 1920 hours of video, even with some idea of where to look, is a daunting task.

The described embodiments may automatically create, from one or more real-time surveillance video recordings, a short video clip (e.g., 10 minute; also referred to herein as a highlight reel) that provides relevant information to the district manager. In certain industries, such as retail chains for quick service restaurants, convenient stores, or food shops associated with gas stations, there are repeated patterns of what the district managers are seeking. The described embodiments may extract and generalize these questions to create an interface of menu options. Using this menu interface, a district manager can specify certain types of events that he or she is interested in seeing within a given time period (e.g., within a day, week or month). The described embodiment may apply various smart video extraction tools to create the highlight reel based on the district manager's interests.

In one aspect, the described embodiments are a method of summarizing events in a video recording. The method includes evaluating at least one video recording to identify event that violate at least one rule. The method further includes excerpting a fragment of the at least one video recording, the fragment containing a depiction of the event. The method also includes causing the fragment to be included in a summary video recording.

In one embodiment, at least one of the one or more rules relates to a threshold amount of motion in a physical space being recorded in the at least one received video recording. In another embodiment, at least one of the one or more rules relates to a threshold duration of motion in a physical space being recorded in the at least one received video recording. In an embodiment, at least one of the one or more rules relates to presence of a particular color in a physical space being recorded in the at least one received video recording. In another embodiment, at least one of the one or more rules relates to a quantity of items in a physical space being recorded in the at least one received video recording. In yet another embodiment, at least one of the one or more rules relates to a size of an item in a physical space being recorded in the at least one received video recording. In another embodiment, the one or more rules further includes one or more rule exceptions.

In one embodiment, at least one fragment in the summary video is presented at a frame rate other than real-time. Another embodiment includes limiting the fragment of the first video to a particular period of time.

One embodiment includes adding additional rules subsequent to initiating the evaluating, and continuing the evaluating with the one or more rules and the additional rules. In another embodiment, at least one received video recordings includes video feeds from two or more physical locations.

In another aspect, the described embodiments are a system for summarizing events in a video recording. The system includes a memory device for storing at least one video recording. The system includes a microprocessor-based workstation configured to evaluate the at least one video recording to identify an event that violates at least one rule. The microprocessor-based workstation is further configured to excerpt a fragment of at least one video recording, the fragment containing the event. The microprocessor-based workstation is further configured to cause the fragment to be included in a summary video recording.

In another aspect, the described embodiments are a tangible, non-transitory, computer readable medium for storing computer executable instructions for summarizing events in a video recording, with the computer executable instructions for evaluating at least one video recording to identify event that violate at least one rule, excerpting a fragment of the at least one video recording, the fragment containing a depiction of the event, and causing the fragment to be included in a summary video recording.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 illustrates an example of a user interface according to the described embodiment.

FIG. 2 illustrates another version of the user interface of FIG. 1.

FIG. 3 illustrates another version of the user interface of FIG. 1.

DETAILED DESCRIPTION OF THE INVENTION

Figure 4:
FIG. 4 illustrates another version of the user interface of FIG. 1.

A description of example embodiments of the invention follows.

The described embodiments provide a summary video recording (also referred to herein as a video digest or video highlight reel), which includes one or more video fragments (i.e., short video scenes) excerpted from what is generally a much longer video recording or recordings, such as one or more real-time surveillance video recordings. The summary video recording is also based on criteria (also referred to herein as rules) provided by a user, i.e., one who is tasked with extracting useful information from video recordings. The particular criteria will be described in detail herein, but may include for example:

(a) Is the video summary fixed duration or variable duration?
(b) If fixed duration, what is the video summary duration?
(c) Which locations should be monitored?
(d) Which areas, within a particular location, should be monitored?
(e) What events, if detected, should trigger excerpting a fragment to the summary video?
(f) Where should the source video recordings be stored?
(g) Where should the summary video be stored?

One embodiment may use motion as an event that triggers excerpting a fragment to a summary video. The embodiment may use a certain amount of motion (e.g., motion across a certain region or motion beyond a certain rate) or lack of motion to trigger excerpting a fragment. Other embodiments may use other events to trigger excerpting a fragment, such as detection of color or a lack of color, or size or quantity of an item.

The described embodiments may provide a user with the ability to set such criteria with a user interface, an example of which is shown in FIG. 1. The user interface may be implemented through software executing on any of a variety of processing platforms known in the art. For example, the software may implement the user interface on a desktop, laptop or notebook computer, on a smartphone, or on a tablet or other such handheld processing device.

The criteria the user sets may be stored locally on the processing device that implements the user interface, or they may be pushed to a remote location across a network (e.g., cloud-based storage). The real-time video recordings may also be transferred to and stored at a remote location across a network. Accordingly, evaluation of the real-time video recording against the criteria can be carried out from anywhere that can access the remote location.

The specific example shown in FIG. 1 depicts the creation of a new summary video recording. The user interface 100 includes a selection icon 102 for initiating a new summary video recording. The selection icon in this case is a graphical button, but other embodiments may use other graphical selection tools known in the art. The user interface 100 also includes a name field 104 that allows a user to enter a name for the new summary video recording. This name field 104 may also display the name of a previously-created summary video recording that is opened for editing on the user interface 100.

The user interface 100 further includes a set of radio buttons 106 for selecting an activity type to be included in the summary video recording. While radio buttons are shown for this example, other graphical selection tools may also be used. The example shown in FIG. 1 presents three different activity types. One selection is "any activity," which essentially places no restrictions on the activity type. Another selection allows a user to place a restriction on the duration of activity to be included in the summary video recording. Another selection allows a user to place a restriction on duration of lack of activity to be included on the summary recording.

The user interface 100 also includes selection tools for selecting either particular locations (stores in this example) or a global "all locations" choice 108; for selecting specific views at the chosen location 110, for selecting evaluation days 112 and times 114; for selecting playback speed for the video fragments excerpted from the longer video recording and placed on the summary video recording. The user interface 100 includes selection tools that allow the user to save 118 the selected rules or to delete 120 an existing rule set.

FIG. 2 illustrates a particular set of rules selected by a user. In this example, the user selected "all stores" 208 with the "offices" view 210, which encompasses potential activity across all stores in the purview of the user (e.g., the district manager). The timeframe selected is the lunch shift from 11:00 am to 1:00 pm, and the type of activity selected in any activity lasting longer than 30 seconds. This particular set of rules would be useful to a fast food chain district manager who is concerned with local managers spending significant amounts of time (i.e., over 30 seconds) in the office, when the local manager should be on the floor handling the lunchtime rush. With this example embodiment, any motion detected in any monitored office, that occurs during lunchtime triggers a video fragment depicting that motion to be excerpted from the surveillance video recording and placed into the summary video recording.

Figure 3:
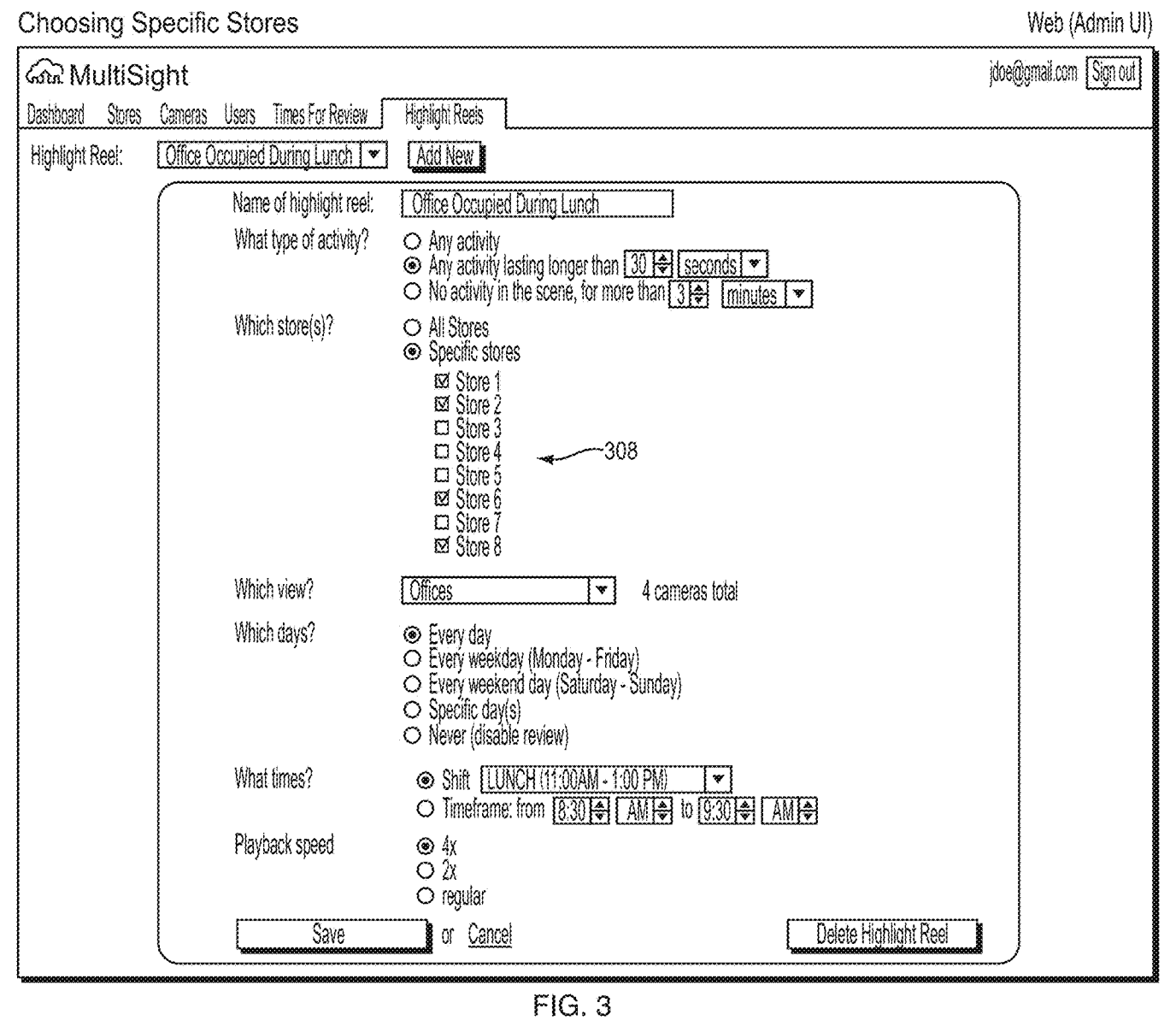

FIG. 3 illustrates a similar rule scenario as is shown in FIG. 2, except with specific stores 308 selected. In this example, only the specified activity occurring in either store 1, store 2, store 6 or store 8 will trigger a video fragment depicting that activity to be excerpted from the surveillance video recording and placed into the summary video recording.

FIG. 4 illustrates a user interface that may be used by several district managers, so that certain stores 408 within certain districts 409 may be selected by each particular district manager.

Figure 5:
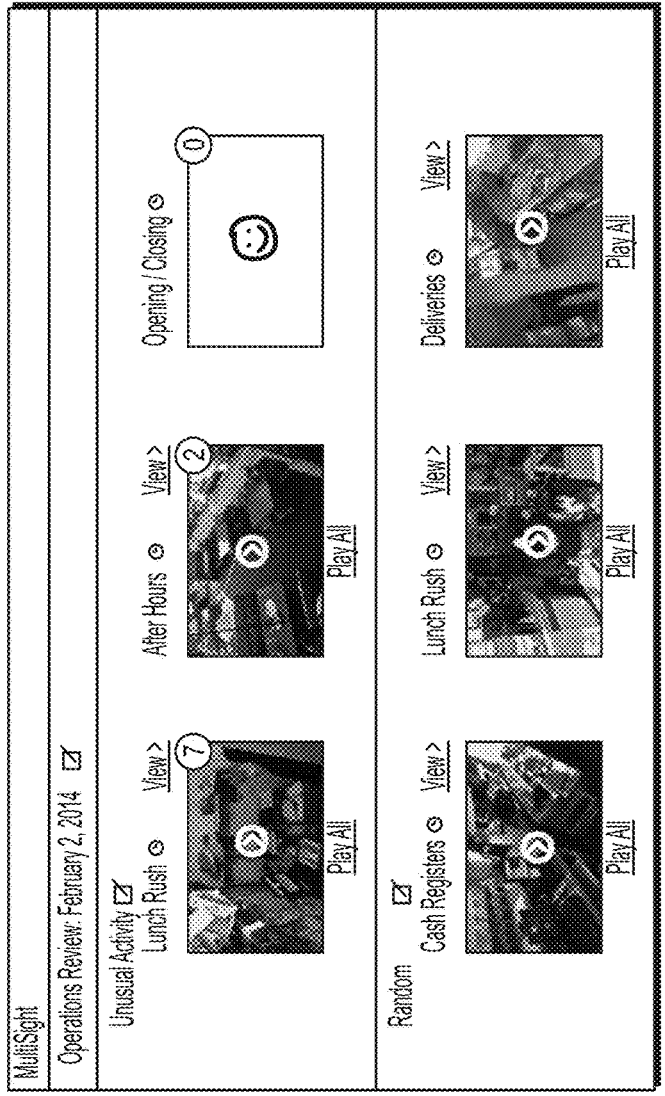
FIG. 5 shows an overview presentation of a summary video recording according to the described embodiments.

One described embodiment may present a summary video overview after generating a summary video recording. An example overview is shown in FIG. 5. In this example, provide an "unusual activity" group 502, depicting results that may have been generated based on rules selected by a user. Each set of results is tagged with an indication 504 of how many video fragments are within a particular category. For example, FIG. 5 shows that seven fragments were found that violated the rule set concerning lunch rush. This example further provides a "random" group 506 that presents a randomly selected set of video fragments from the surveillance video recording. This example also provides a summary table 508 that provides a listing and description of the fragments presented for this overview.

Figure 6:
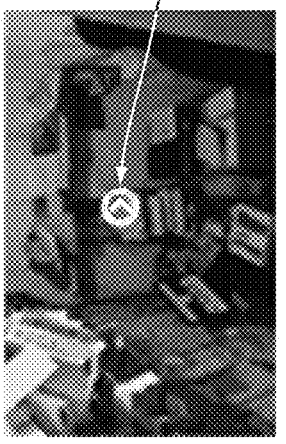
FIG. 6 shows an example of a dashboard according to the described embodiments.

The described embodiments may also provide a dashboard presentation to the user that provides a high-level view of the summary video recording. FIG. 6 illustrates an example of a dashboard according to the described embodiments. A first indication 602 provides a green dot with "yes" to the question, "Did every store open on time," which indicates that every store the user is entitled to monitor opened on time. A calendar control 604 allows a user to select a particular day for dashboard results. A video viewer 606 is provided to show video fragments associated with certain dashboard items. In this example, a video of the Modesto store is shown. The video viewer includes a "share clip" (i.e., share video fragment) feature 608 that allows the user to convey the fragment to other users. A "view clip in context" tool 610 allows the user to view a single camera view, at the date and time on that specific camera in that selected store. These are all parts of an example dashboard—other features may alternatively be used or in addition to what is shown.

In some embodiments, the summary video recording may be a fixed duration, selected by the user. With a summary video recording of fixed duration, the duration of each video fragment of the summary video will change depending upon the total number of video fragments. In some embodiments, the fragment remains displayed in real-time with less of the real-time information provided. In other embodiments, the fragment is "sped up" so that more real-time information is compressed within a particular amount of time.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein Further, certain embodiments of the invention may be implemented as logic that performs one or more functions. This logic may be hardware-based, software-based, or a combination of hardware-based and software-based. Some or all of the logic may be stored on one or more tangible computer-readable storage media and may include computer-executable instructions that may be executed by a controller or processor. The computer-executable instructions may include instructions that implement one or more embodiments of the invention. The tangible computer-readable storage media may be volatile or non-volatile and may include, for example, flash memories, dynamic memories, removable disks, and non-removable disks. While this invention has been particularly shown and described with references to example embodiments thereof, it will be understood by those skilled in the art that various changes in form and details may be made therein without departing from the scope of the invention encompassed by the appended claims.

What is claimed is:

1. A method of summarizing events in a video recording, comprising:
    displaying a user interface implemented through software executing on a processing platform, the user interface configured to present selection tools for the user
        to select one or more rules for monitored geographic locations of events within the video recording to be evaluated,
        to select one or more rules for monitored times of occurrence of events to be evaluated,
        to select one or more rules for playback speed for video fragments excerpted from at least one video recording and placed on a summary video recording, and
        to save the selections on a storage as one or more rules comprising at least one activity type criterion, at least one monitored geographical location of events in the video recording to be evaluated criterion and at least one monitored time of occurrence of events to be evaluated criterion;
    generating, by the user interface, one or more rules comprising
        the at least one activity type criterion,
        the at least one monitored geographical location of events to be evaluated criterion, and
        the at least one monitored time of occurrence of events to be evaluated criterion, and
    saving the one or more generated rules on the storage, wherein the one or more rules relate to a restriction on a duration of lack of activity in a physical space being recorded in at least one received video recording;
    using a microprocessor operatively coupled to a memory device;
    evaluating, by the microprocessor, the at least one received video recording stored on the memory device to identify an event within the at least one received video recording that satisfies the one or more generated rules accessed from the storage, wherein the at least one monitored geographical location of events to be evaluated criterion associated with the rules describes a monitored geographical location of the event and the at least one monitored time of occurrence of events to be evaluated criterion associated with the rules describes a monitored time of occurrence of the event that is depicted by video content recorded on the at least one received video recording;
    excerpting, by the microprocessor, a fragment of the at least one received video recording, the fragment containing a depiction of the event, wherein the fragment at least satisfies the at least one activity type criterion; and
    causing, by the microprocessor, the fragment to be included in the summary video recording.

2. The method of claim 1, wherein at least one of the one or more rules relates to a threshold amount of motion in a physical space being recorded in the at least one received video recording.

3. The method of claim 1, wherein at least one of the one or more rules relates to a threshold duration of motion in a physical space being recorded in the at least one received video recording.

4. The method of claim 1, wherein at least one of the one or more rules relates to presence of a particular color in a physical space being recorded in the at least one received video recording.

5. The method of claim 1, wherein at least one of the one or more rules relates to a quantity of items in a physical space being recorded in the at least one received video recording.

6. The method of claim 1, wherein at least one of the one or more rules relates to a size of an item in a physical space being recorded in the at least one received video recording.

7. The method of claim 1, further including (i) causing two or more video recording fragments to be included in the summary recording, (ii) limiting the summary recording to a fixed duration, and (iii) changing an amount of real-time information in each of the two or more video recording fragments to fit the two or more video recording fragments within the fixed duration.

8. The method of claim 1, further including (i) causing two or more video recording fragments to be included in the summary recording, (ii) limiting the summary recording to a fixed duration, and (iii) speeding up at least one of the two or more video recording fragments to fit the two or more video recording fragments within the fixed duration.

9. The method of claim 1, wherein the one or more rules further includes one or more rule exceptions.

10. The method of claim 1, further including adding additional rules subsequent to initiating the evaluating, and continuing the evaluating with the one or more rules and the additional rules.

11. The method of claim 1, wherein the at least one received video recordings includes video feeds from two or more physical locations.

12. A system for summarizing events in a video recording, comprising:
   a user interface implemented through software executing on a processing platform, the user interface configured to present selection tools for the user
      to select one or more rules for monitored geographic locations of events to be evaluated,
      to select one or more rules for monitored times of occurrence of events to be evaluated,
      to select one or more rules for playback speed for video fragments excerpted from at least one video recording and placed on a summary video recording, and
      to save the selections on a storage as one or more rules comprising at least one activity type criterion, at least one monitored geographical location of events in the video recording to be evaluated criterion and at least one monitored time of occurrence of events to be evaluated criterion;
   a memory device configured to store at least one received video recording and the one or more rules accessed from the storage comprising:
      the at least one activity type criterion,
      the at least one monitored geographical location of events to be evaluated criterion, and
      the at least one monitored time of occurrence of events to be evaluated criterion,
   wherein the at least one activity type criterion relates to a restriction on a duration of lack of activity a physical space being recorded in at least one received video recording;
   a microprocessor-based workstation configured to
      (a) evaluate the at least one received video recording stored on the memory device to identify an event within the at least one received video recording that satisfies the one or more rules, wherein the at least one monitored geographical location of events to be evaluated criterion associated with the rules describes a monitored geographical location of the event and the at least one monitored time of occurrence of events to be evaluated criterion associated with the rules describes a monitored time of occurrence of the event that is depicted by video content recorded on the at least one received video recording,
      (b) excerpt a fragment of the at least one received video recording, the fragment containing the event, wherein the fragment at least satisfies the at least one activity type criterion, and
      (c) cause the fragment to be included in the summary video recording.

13. The system of claim 12, wherein at least one of the one or more rules relates to detecting motion in a physical space being recorded in the at least one received video recording.

14. The system of claim 12, wherein at least one of the one or more rules relates to detecting a quantity of an item in a physical space being recorded in the at least one received video recording.

15. The system of claim 12, wherein at least one of the one or more rules relates to detecting a size of an item in a physical space being recorded in the at least one received video recording.

16. The system of claim 12, wherein at least one of the one or more rules relates presence of a particular color in a physical space being recorded in the at least one received video recording.

17. The system of claim 12, wherein the at least one received video recordings includes video feeds from two or more physical locations.

18. A tangible, non-transitory, computer readable medium for storing computer executable instructions for summarizing events in a video recording, with the computer executable instructions for:
   displaying a user interface implemented through software executing on a processing platform, the user interface configured to present selection tools for the user
      to select one or more rules for monitored geographic locations of events to be evaluated,
      to select one or more rules for monitored times of occurrence of events to be evaluated,
      to select one or more rules for playback speed for video fragments excerpted from at least one video recording and placed on a summary video recording, and
      to save the selections on a storage as one or more rules comprising at least one activity type criterion, at least one monitored geographical location of events in the video recording to be evaluated criterion and at least one monitored time of occurrence of events to be evaluated criterion;
   generating, by the user interface, one or more rules comprising
      the at least one activity type criterion,
      the at least one monitored geographical location of events to be evaluated criterion, and
      the at least one monitored time of occurrence of events to be evaluated criterion,
   saving the one or more generated rules on the storage, wherein the one or more rules relate to a restriction on a duration of lack of activity in a physical space being recorded in at least one received video recording;
   using a microprocessor operatively coupled to a memory device;
   evaluating, by the microprocessor, the at least one received video recording stored on the memory device to identify an event within the at least one received video recording that satisfies the one or more generated rules accessed from the storage, wherein the at least one monitored geographical location of events to be evaluated criterion associated with the rules describes a monitored geographical location of the event and the at least one monitored time of occurrence of events to be evaluated criterion associated with the rules describes a monitored time of occurrence of the event that is depicted by video content recorded on the at least one received video recording;
   excerpting, by the microprocessor, a fragment of the at least one received video recording, the fragment containing a depiction of the event, wherein the fragment at least satisfies the at least one activity type criterion; and
   causing, by the microprocessor, the fragment to be included in the summary video recording.

19. The medium of claim 18, further including instructions for limiting the fragment of the first video to a particular period of time.

20. The medium of claim 18, further including instructions for transferring the summary video to a remote storage network.

* * * * *